(12) United States Patent
Conti

(10) Patent No.: US 11,508,002 B2
(45) Date of Patent: Nov. 22, 2022

(54) TOTEM BASED BEAUTY CONSULTING SYSTEM AND INTERFACE

(71) Applicant: Mario Conti, New York, NY (US)

(72) Inventor: Mario Conti, New York, NY (US)

(*) Notice: Subject to any disclaimer, the term of this patent is extended or adjusted under 35 U.S.C. 154(b) by 0 days.

(21) Appl. No.: 17/198,180

(22) Filed: Mar. 10, 2021

(65) Prior Publication Data
US 2021/0201389 A1 Jul. 1, 2021

Related U.S. Application Data

(63) Continuation-in-part of application No. 16/501,978, filed on Jul. 15, 2019, now abandoned.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0643* (2013.01); *G06Q 30/0261* (2013.01); *G06Q 30/0627* (2013.01); *G06Q 30/0631* (2013.01); *G06Q 30/0635* (2013.01)

(58) Field of Classification Search
None
See application file for complete search history.

(56) References Cited

U.S. PATENT DOCUMENTS

| | | | |
|---|---|---|---|
| 10,387,937 B1 | 8/2019 | Tuan et al. | |
| 2003/0065524 A1* | 4/2003 | Giacchetti | A61B 5/444 700/49 |
| 2006/0095297 A1 | 5/2006 | Virik | |
| 2014/0074712 A1* | 3/2014 | Palmer | G06Q 30/06 705/300 |
| 2015/0243100 A1 | 8/2015 | Abovitz et al. | |
| 2017/0024717 A1* | 1/2017 | Istrati | G06Q 30/0641 |
| 2019/0378187 A1 | 12/2019 | Lin et al. | |

OTHER PUBLICATIONS

Carty, David, AWS IoT (Amazon Web Services internet of things), WhatIs.com, Aug. 2016 (Year: 2016).*
Kumar, Nirmal, Exploring Deputy API Services, medium.com, Oct. 19, 2018 (Year: 2018).*
Ramakrishnan, Shriya, The Past, Present, and Future of WebRTC, agora.io, Apr. 16, 2020 (Year: 2020).*

* cited by examiner

*Primary Examiner* — Meredith A Long
(74) *Attorney, Agent, or Firm* — Jonathan Bick

(57) ABSTRACT

A totemic system and method operating to sell preselected goods and services proximal to a totem and simultaneously to a remote consumer of beauty products in communication with an optimized remote beauty-consultant, to stimulate the consumer to travel to the totem's location for said goods or services. The method displays transactional information and facilitates beauty product sales, comprising at least one remote offer from a beauty consumer, at least one remote response from a beauty consultant regarding appropriate products available nearby as displayed to said consultant by a content database. The method facilitates brand and store loyalty, combining software and human interaction, preferably at retail location or by closing online sales.

6 Claims, 17 Drawing Sheets

TOTEM BASED BEAUTY CONSULTING SYSTEM AND INTERFACE

CROSS-REFERENCE(S)

The present invention is a continuation in part of application Ser. No. 16/501,978 (filed Jul. 15, 2019) and claims priority thereto.

FIELD OF THE INVENTION

The described invention relates generally to a totem beauty consulting interface system. In particular, the present disclose is directed to a totem based beauty consulting system and interface that is configured to combine existing totem, computers and mobile device facilitate the sale of goods to a consumer who can't see or hear the totem element of the present invention when initially contacted.

BACKGROUND OF THE INVENTION

Retail totem are often used in retail environments in high-traffic areas, eye-catching totem displays allow brands to differentiate themselves over the competition and drive increased sales of good proximately located to said retail totems.

Said totem are made of a variety of material from corrugated cardboard which are lightweight, and can be moved around easily to rigid metal frames combined with removable panels which cannot be moved. Some existing totem have computer. For example, some totems have computer which display digital signage to sell goods proximal to said totems.

Other totem have been integrated into kiosks can be used effectively is in restaurants, café s and fast-food chains. Not only can they be used to advertise special offers, but can also show up-to-date menus with clear allergen information.

They all share one short coming, namely they are designed and directed to selling goods which are proximal to them to consumer who are proximal to said totems. None have the capacity or are directed to communicating with consumer who are remote (not with range to see said totem or to hear said totem) in order to sell goods.

The present invention is directed to using a totem to sell goods to consumers who are remote to said totem. (not with range to see said totem or to hear said totem). More specifically, the present invention initiates sales of good which are proximal to a totem disclosed in the present invention. The present invention is directed to selling goods to remote consumer which are proximal to said totem (i.e. proximal means that the consumers are close enough to said totem that a consultant user of said totem, such as a beauty consultant service provider using said totem may receive an enhance image of said consumer user when they use goods proximal to said totem). This result is achieved by the present invention by combining of existing technology including three hardware elements, namely a totem, a smart phone and a pad-tablet. Each of these elements requires a minimum configuration. These devices are configured into a system directed to allow a novel beauty consulting system and interface. More specifically, the novelty of said system and interface system is directed to allowing a user both remotely and proximally beauty consultations with a remote consultant via single interface.

Existing totem systems are located in store and normally sell goods which are proximal to said totems. They do not address the issue of bringing consumers located remotely to said totem into proximity to the goods said totems are designed to sell. The present invention surmounts said short coming.

Globalization, the advent of social media and different cultural models have led to a fracturing and, very often, a reduction in social interactions and human relationships that often take place exclusively through e-mails, posts and digital interactions.

At the micro level, in the retail world, the social lack of human relations and the rapid development of the e-commerce tool (especially mobile) has led people (the consumer) to no longer enter the store, preferring to purchase online.

This developed consumer attitude has not only led to a notable decrease in the flow of customers within the stores, with a constant decrease in sales, but also an "inability" of the consumer to experience a purchase essentiality, highly sought after, losing therefore all those human incentive values that a personal and personalized advice can give.— employees stand near counter in department stores and wait for customer This fundamental lack in human relationships and the impossibility of having "new" human relations through technology, is bringing real and concrete negative data into the global financial markets and not only more national ones.

Confirming this widespread fear of not interpreting the needs and requirements of the new consumer in the best possible way, the big players of the global financial and retail market have wondered how to respond to this gap in generational communication.

Arriving at an answer where; "If we fail to understand our consumer, there can be no technology in the world that can save us"

Instant messaging is an example of this and confirming this widespread fear of not "understanding" the new consumer, in the last two years from industry sources and above all from the decisions and investments/projects that the big retail players (not only physical but also online).

As result various elements of the market have needs. For example, beauty brands, such as Revlon, need to sell their products, increase brand awareness, overcome the competition, create profit and retain customers. Department stores, such as Bloomingdales, need to sell products within the store, retain customers, create traffic inside the store, differentiate the merchandise offer within the store, offer services, overcome the competition and create profit. Customers need to receive a quality service, consciously spend, buy according to individual needs and transform the moment of purchase into a personal, quality but relaxed moment.

The market is changing. The growth of the offer (in terms of services, products and stores) has led the market to focus on its competitors losing sight of the consumer. For this reason, the offer has become higher than the demand and more and more often the two do not coincide: the consumer has needs and requests that the store and/or brands cannot satisfy, The growth of the online and the rise of figures like influencers, but also the rise of new brands (the so-called indie brands) often sold exclusively online have led the consumer to buy in other ways than the traditional ones. The development of technology and tools and tools that allow you to always be online and to be able to buy anywhere. The consequent automation of the purchasing process. The many and constant needs of consumers have led retail to increase sales points, employees and working hours, in many cases obtaining the broken bank. The worldwide expansion of the retail market which does not always know or understand how to adapt to the cultural differences of a country.

The consumer's habit of receiving a personalized, constant and quality service that is always present and easily accessible. The birth of personalized and ever-present assistance (see the boom of Alexa, Amazon's personal assistant)

Retail and the retail world must adapt to the growing needs of consumers, the "old" ones who are still attached to the physical sales point and to the concept of salespeople but who know that they can spend less using other channels, but above all "New" consumers, the Millennials or the new Generation 2020, which decide, buy and change habits very quickly. Thus, was born the RETAIL 4.0, which obliges the stores that have the following characteristics:

- Multicultural Shopping Experience: Customers will tend to expect different types of shopping experiences with routes that ideally cross different channels depending on the time, desire or need
- Proportion between tech and business: Technology will make it possible to significantly increase brand productivity, significantly impacting even the competition on prices
- Retailing: Retailers will have to learn to look better at their new competitors. On the distribution market, in fact, new distribution models are emerging that come from other sectors such as, for example, Amazon or Peapod.
- Big Data Management: Tracking, analyzing and monetizing consumer data will become fundamental to the business. This means learning to think about integration and convergence, making the most of any type of information flow that tells the customer journey through the thousand streams of the Network
- Cross-media and cross-functional skills: Triangular Technology, Marketing and Merchandising. The Digital Innovation Officer is a complex figure, who in addition to having experience in sales techniques knows the psychology of consumers, profiled by target, has a good dose of creativity to invent systems and solutions for engagement and promotion, knows what to ask the system integrators to get the best out of technological innovation and speak with IT to share processes and results in a useful way for all company departments.

Smart logistics are now a must have element. Ensuring the distribution of the last mile: the most innovative, efficient and effective logistics services will be guaranteed by new partnerships that will enable a more punctual and on demand response. Unsolved problems, inefficiencies, disadvantages As a result of said changes a new set of consumer needs has arisen. In particular, consumers simply don't want to buy but they are looking for an experience to share. They want to buy through different channels than the classic ones. Consumers are pushed to buy in places and goods suggested by digital Consumers have a different approach than the previous generation with retail. They continue to use the classic purchase channels but use them in a totally different way. Consumers today act as if the purchase does not depend (or not only) on the product but above all on the service and engagement that the store can offer. The new consumer must be interested in what the store and brand offer. The new consumer buys both offline and online (the second more) but in both cases he must feel involved and live an experience. The new consumer will share his experience on his social media, so his followers will probably be interested in trying/repeating his experience. Therefore, the quality of the service/experience must be very high and satisfactory.

Thus, the store must create a real relationship with its consumer. Often this new consumer can be a celebrity and/or an influencer (not just a normal customer) so his sharing will be even more extensive and important for the store To properly react to said changes in consumer behavior. Retail stores must change from a physical form (location) at least temporarily to a non-physical form such as online. Thus, retail entities need to remain relevant and indispensable (why enter a physical store if I find it online by avoiding traffic, people, bad weather etc.?)

Stores store must embrace the culture of change and study dedicated and innovative results. They need integration between services and customer engagement, as well as to have precise and specific profiling of customers to satisfy their requests. This is currently being done by having IT points in the store, linking physical store and e-commerce.

In this scenario, technology and its development continue incessantly, outlining new social and commercial landscapes that often, however, do not meet the needs of the physical store.

Vice versa, the brands and the retail chain are incapable of exploiting the development of the online to their advantage, transforming it into opportunities and support for their communication and commercial strategies.

The current scenario therefore identifies three protagonists: retail, the consumer and online.

In addition, not all potential employees can may stand, possibly because they are disabled. Not all potential employees have the time to work an eight-hour shift; and not all customers want to go to stores and talk with people whom they do not know.

There exists a need for a mobile user interface suitable for mobile computing devices uses device location to select a portion of information content that is displayed. Information content (e.g., documents, contact information, files or video) is presumed located in various locations with the mobile user interface displaying a portion of the content as if viewed in person. Data from motion, distance or position sensors are used to determine the location of the device with respect to the content to select the portion for display. Content elements can be selected by centering the display on the desired portion, obviating the need for cursors and pointing devices (e.g., mouse or touchscreen).

The present invention is a novel graphic interface which supports a streaming consulting service is an online service that, through APP and smartphone, allows any person to receive specific advice on the world of cosmetics with a specifically trained consultant.

The present invention results in electronic transactions designed to encourage, at the end of the consultation, the consultant, by geo-location, will indicate to the consumer the store closest to his position to go to for the purchase of the recommended products.

Said encouragement is based on the presence of particular agreements or periods of the year, the consultant may direct the consumer in certain stores, still close to his position, but on which there will be discounts, purchase vouchers, gifts or events/marketing activities.

The present invention results in work product. In particular, the present invention will send a notification to the consultants physically present in the store, with the name and photo of the client who is about to go to the store and the product they intend to buy The present invention facilitates a beauty product consulting service through APP will be available 24/7 to the consumer and will provide advice on the beauty market generally intended (makeup, fragrances, skin care, hair, body).

Said consulting service, as well as through the APP, will also be available in stores on specific Video Totems set up for this purpose. Through these totems the consumer can:
1) continue a consultancy previously initiated via APP.
2) start a new consultancy, directly through the totem in the store, selecting the Make a Call option In the case of a party engaged in an ex-novo consultancy (such as said Make a Call option) the user will not necessarily have to have previously signed up for the use of the present invention. The user/consumer can make a new consultation directly through the totem in store at the end of which he can decide whether to download the app and/or create his own personal profile to be used for future consultancy.

The present invention discloses the structure of a novel computer interface for beauty consulting and illustrates the functionalities and related service Advantages of the Present Invention in Comparison with the Prior Art Totem are traditionally used to sell goods which are proximal to said totems. Totems are used sell goods to consumers who are proximal to said totems. Existing totems are not used or used to bring consumer who are remote to said totems into stores which said totems are located. Thus, existing totems are not directed to selling sell goods which are proximal to said totems to remote customer (i.e. consumer who are not aware of said totem).

The present invention is direct to prevailing over this short coming. Unlike totem disclosed in the prior art, the present invention is directed to selling beauty goods located proximally to the totem to remote consumers. The present invention is directed to providing a consumer user a single interface with a single consultant user whether said consumer user is remote and proximal to the beauty goods located proximally to the totem element of the present invention. via single interface, wherein said interface may be continuously between said consumer user and said consultant user (also known as beauty consultant service provider hereinafter) of the present invention.

Traditionally, totems have been used in stores to sell goods which are proximal to said totems. Said totems can be configured to allow communications between consumers proximal to said totems and consultants (or sales representatives) that at located remotely from said totems.

Currently, systems exist which allow a remote customer user (i.e. one seeking beauty advice and consultation) to interface with a remote beauty consultant user (i.e. one seeking to provide beauty advice and consultation). Systems also exist which allow systems exist which allow an in store customer user (i.e. one seeking beauty advice and consultation located in a store selling beauty products) to interface with a remote beauty consultant user (i.e. one seeking to provide beauty advice and consultation). No system was found which does both while preserving and continuing the consultation between the consumer user and the consultant user.

This result is not unexpected because there is not technological reason to route communications and data among a consumer user located remotely from a store selling beauty goods and a consultant user located remotely from a store selling beauty goods through an in store totem selling beauty goods proximal to said totem.

The present invention is directed to permitting a consultant user to initiate contact a potential buyer of the goods located proximally (i.e. the consumer user of the present invention) to the totem disclosed by the present invention, continuous communication between said consultant user and said consumer user while said consumer user moves to a location proximal to said totem, and allow said consumer user to have enhanced visual images of said consumer user when communications are proximal to said totem. Said enhanced images will improve the consultation as said consumer user applies goods proximal to said totem.

The advantages of the present invention in comparison with the prior art for the consumer use includes: Personalized, personal but repeatable experience: the customer will have the certainty of receiving 100% personalized advice and consequently of making "smart" purchases;

"Real" advice and experience: the present invention (a computer graphics interface) enables service is not linked to any brand so the consultant will offer a service that truly respects the consumer's needs and habits;

24/24H service on any day and in any part of the world: on vacation or on the road the consumer will have the certainty of being able to buy his favorite products wherever he is and to be able to request advice at any time;

Advice for purchases from third parties or for gifts from trained and informed people who will advise and buy a product online to my requests;

Ability to customize the request (which is not possible through online purchase); and The possibility to see the nearest stores and above all with the products they are interested in.

The benefits of the present invention over the prior art for beauty brands is as follows:

Insured and targeted sales;
Customer loyalty to the brand;
Savings on trade and marketing investments;
National and international consulting and sales service, 24/24, 7/7;
Precise profiling of customer;
Profiling of the most sold products;
Profiling of the most and least profitable periods of the years.
Profiling of the most and least performing zones and stores;
The connection between the APP and the totem can be used for events or training: the natural person in the store will no longer be required (cutting costs) but can be through the totems in more stores at the same time; and
The brand receives from the present invention customized and real reports on the geography and behavioral habits of consumers regarding the products of their brand.

The benefits of the present invention over the prior art for stores is as follows:

In-store consumer experience: with totems, retail can create new experiential purchasing methods;
From online to offline: using online tools (apps, videocall, smartphone) as a means to bring customers back to the store to necessarily buy;
Increase in in-store traffic and consequently in purchases;
From the offline to the online: the different totem options offer different solutions within the store, not only for consultancy but also for purchase;
The connection between the APP and the totem can be used for events or training: the natural person in the store will no longer be required (cutting costs) but can be through the totems in more stores at the same time;

In the store, the consumer can also order finished products inside the physical store, directly from the totem and by connecting to the store's online store; and The present invention can also consult the catalog, read magazines or interact transversally with the online initiatives of the store but within it.

Other benefit of the present invention includes:

assistance for disabled workers (allow disability more work and; allow disabled people to a job which they are not able;

assistance for elderly worker (allow more consultant with high experience cannot work for 6/8 stand up in the store, with present invention they can work at home); and assistance for workers in poverty areas (allow worker who live in area without stores to work in their community).

SUMMARY OF INVENTION

The present invention relates generally to a totem beauty consulting interface system. More specifically, the present disclose is directed to a totem that is configured to combine existing computers and mobile device to be controlled jointed by a consumer user and a consultant user simultaneously to facilitate selling good proximally located to said totem. Said consumer user generally located remotely from said totem is contacted by said consultant user. Said consultant user may be in continuous or intermittent contact with said consumer user as said consumer user proceeds to said totem (note beauty goods are located proximally to said totem). Once said consumer user is proximal to said totem, said consultant user may view said consumer user using enhanced imaging camera located in said totem and said consumer user may access beauty goods located proximally to said totem. The present invention is directed to facilitate a continuous interactive a beauty consulting for a consumer use who is initially remote from said totem until said consumer use is proximal to said totem using a single system and interface for the purpose of selling goods located proximal to said totem.

The present invention is a combination of existing technology including three hardware elements, namely a totem, a smart phone and a pad-tablet. Each of these elements requires a minimum configuration. These devices are configured into a system directed to allow a novel beauty consulting system and interface. More specifically, the novelty of said system and interface system is directed to allowing a user both remotely and proximally beauty consultations with a remote consultant via single interface.

Existing totem systems are located in store and normally sell goods which are proximal to said totems. They do not address the issue of bringing consumers located remotely to said totem into proximity to the goods said totems are designed to sell. The present invention surmounts said short coming.

The present invention is based on social values and principles and on the importance of the human relations, which is currently the missing factor in the relationship between store/brand, consumer/customer and online. The present invention is a computer graphic interface to provide said missing human relations factor for the sale of beauty products in support of the relationship between store/brand, consumer/customer and online.

The present invention's computer graphic interface supports a streaming beauty consulting service is an online service that, through APP and smartphone, allows any person to receive specific advice on the world of cosmetics with a specifically trained consultant (such as a beauty consultant service provider).

The present invention is comprised of various existing computer and communion machines integrated via an Internet service that, through mobile APP, allows any person to receive specific advice on the world of cosmetics with a specially trained consultant. More specifically, The user from APP can make a video/audio call to one of the consultants available asking for directions on the beauty market generally understood (makeup, fragrance, skincare, hair, body). During the call, the consultant (sometimes known as consultant users and/or beauty consultant service provider), on the basis of the user's geolocation, will be able to indicate the store nearest to his position where to go for the purchase of the recommended products. The consultant can also tell the customer the consultant in the shop that can follow it directly and can stay in communication with said customer (also known as customer user) while said customer move from a location which is remote of the totem element of the present invention (remote being said customer user can't see or hear the totem element of the present invention) to a location which is proximal to the totem element of the present invention (proximal being close enough to said totem such that the customer user may apply the goods proximally located to said totem which a consultant user—such as a beauty consultant service provider—may see an enhanced—meaning detailed close up image of said consumer user—provided by said totem).

The elements of the present invention include: . . . a back-end which is suitable to provide the API for the actors defined above and for the query with the CRM; Deputy APIs suitable to supply the API to collect information regarding the stores and the hours of availability of the employees; Paypal APIs suitable to supply the API to make a payment with credit cards or other type of payment; PubNub APIs suitable to supply the messaging service. It delivery messages to client platforms; Agora APIs suitable to supply the WEB RTC service to make an audio/video call between end customers and consultants.

These elements are related as illustrated in FIG. 17:

The main components are as follows: a Route 53 to be used as a DNS management to create individual zone(s); a Cloudfront as entry point for caching static resource or resource that do not change often over time; API Gateway for mapping path to Elastic Beanstalk exposed services; Elastic Beanstalk as the core of the business logic. Beanstalk host the web apis that delivery contents to the client applications, such as authentication, gives consultants and store list and much other; Bucket S3 for store files such as products images and user profile images. 53 is also used for store WEB CMS's source files; Lambda, more specially AWS Lambda to host microservices such as real-time image resize; RDS and Redis as a database; SES as the app's mail service for sending e-mails such as registration mail—SES gives high delivery rate and don't degrade web service app performance; and AWS IoT to connect totems to other systems.

These elements are connect as disclosed in FIG. 2-16 of this application.

The consumer facing element of the present invention is an application which may reside on a mobile device, such as a cell phone. Through the present invention said application is capable of creating personal profiles. A consumer-user of said profiles the present invention may:

1) request online advice 24/7 from a team of professional and trained consultants;
2) know the stores closest to the current location to buy the recommended products or favorites;
3) record and keep a record of all purchases made in the perfumery, through the advice transmitted via the present invention; and
4) evaluate the consultants using the present invention, voting for their favorite. In this way the consumer will be automatically put in contact with one of his favorite consultants.

The selection system will be a "ranking", i.e. if the consultant with the highest grade will not be available for consultancy, the one with the lowest grade will be selected. The present invention is designed to make sure to give the consultant a quality service through the customer's preferred consultants.

The present invention will record all purchases made through the app's advice, the stores visited and the consultants used. In this way the consumer will have a continuous and always personalized experience.

The present invention includes a registration element. The registration of purchases will be used by the consultant to guarantee the client a continuity of his beauty and treatment protocol, as well as to ensure that the consumer is always offered suitable products that meet his needs (preferred brand, intolerances and allergies, price range, location, treatment, nuances and compositions—especially for makeup, olfactory notes, etc. . . . ).

The present invention discloses an application download which is anticipated to be free for all consumer-users who at the time they download it will receive a series of call tokens (each corresponding to total time of call/advice).

At the end of the free trial, the consumer-user will have two ways to continue using the present invention, and take advantage of their personal beauty consultant service provider:
 classic payment: by credit card and/or PayPal service
 social coin: by using its "digital" reputation, customers will be able to purchase additional minutes and consultations.

Through the sharing of posts or content distributed by the current invention on present invention users' social profiles (Facebook and Instagram), the consumer user can have access and earn minutes (tokens) advice and continue to use the present invention.

The advice tokens will have different value based on the number of re-posts and followers that the consumer user has (the more followers, the more minutes/tokens earned).

Alternatively, if the present invention was linked/sponsored by a brand and therefore the consultancy will be exclusively linked to the products of this brand, the service will be free and no limits for the consumer user.

The present invention, at the conclusion of said consultation, the consumer user as identified by geo-location, will indicate to the consumer user the store closest to his position to go to for the purchase of the recommended products.

In the presence of particular agreements or periods of the year, the consultant may direct the consumer in certain stores, still close to his position, but on which there will be discounts, purchase vouchers, gifts or events/marketing activities.

At the end of the consultation the present invention will send a notification to the consultants physically present in the store, with the name and photo of the client who is about to go to the store and the product they intend to buy.

The present invention provides a consumer-user interface to support a streaming beauty consultancy service. The present invention may be used to implement an Internet service that, through a mobile application that allows any person to receive specific advice on the world of cosmetics with a specially trained consultant.

The present invention permits said consumer user to initiate communication (such as at least one remote offer) from an application via a video and or an audio call to another who is a beauty consultant service provider. The present invention supports the interchange of beauty market content. Beauty market content is generally understood to be information relate to makeup, fragrance, skincare, hair care, and body care.

During said communication initiation, the present invention facilitates by selecting a beauty consultant service provider, on the basis of said consumer user's geolocation, produces beauty market content related to product available in a store near the geographical location of said consumer user.

The present invention allows said communication to be redirected to a totem at a store near the geographical location of said consumer user The present invention is a consumer user interface. Said interface is composed of eight elements. These elements are:
 a mobile application;
 a content management system;
 a totem;
 a back-end system;
 an application programming interface system;
 a payment system;
 a global data stream network (DSN) and real time infrastructure-as-a-service provider; and
 an Agora or Agora-type sub-system.

The present invention requires three hardware elements, name a totem, a smart phone and a pad-tablet. Each of these elements requires a minimum configuration. More specifically:

Said totem requires the following:
 Display: from 24" 16,7 M Colori—IPS Led
 Touch: Multi-touch display
 Resolutions: 1920×1080 Full HD
 Brightness/Contrast: 225 cd/m2, 1000:1
 Viewing angle: 0:178° V:178
 CPU: Quadcore 1.6 Ghz
 Memory RAM: 2 Gb RAM
 Memory ROM: 16 Gb ROM
 Memory Expansion: SD Card (32 GB massimo)
 Communication ports: 2 USB 2.0, 1 HDMI
 Temperature: −5°/+50°
 Humidity: 40%-80%
 Structure: Metal body (example)
 Camera: minimum 1.2 MP, HD video (720p)
 Speakers: high volume and high fidelity Said smart phone's minimum specifications depend upon the device for example:
 Android version 6.0
 Minimum CPU processor: A33 Quad Core ARM Cortex-A7 CPU (4×1.3 GHZ)
 Resolution: 1024*600
 RAM: 1 GB
 ROM: 8 GB, add up to 32 GB via Micro SD
 Dual cameras: 0.3 MP front and 2.0 MP rear (optional)
 Wi-Fi: 802.11 b/g/n
 Bluetooth: 4.0
 3G enable: 3G dongle support
 G-sensor: support Alternatively for min iOS version 11 the following is required:
System on chip Apple A6
CPU 1.3 GHz dual core 32-bit ARMv7-A "Swift"
Memory 1 GB LPDDR2-1066 RAM
Storage 16, 32 or 64 GB
Battery 3.8 V, 5.45 Wh (1,440 mAh) Lithium-ion battery [8]
Data inputs "Multi-touch touchscreen display, 3-axis gyroscope, 3-axis accelerometer, Digital compass, Proximity sensor, Ambient light sensor"
Display "4 in (100 mm) diagonal (16:9 aspect ratio), multi-touch display, LED backlit IPS TFT LCD, 1,136×640 pixels at 326 ppi, 800:1 contrast ratio (typical), 500 cd/m² max. brightness (typical), Fingerprint-resistant oleophobic coating on front"
Rear camera "8 MP iSight back-side illuminated sensor, HD video (1080p) at 30 frame/s, IR filter, Aperture f/2.4, 5 element lens, Facial recognition (stills only), Image stabilization"
Front camera 1.2 MP, HD video (720p)
Sound "Single loudspeaker, 3.5 mm TRRS, 20 Hz to 20 kHz frequency response (internal, headset), 3.5 mm audio jack, Microphone"
Connectivity "All models"
Said pad-tablet's minimum specifications:
Operating system "Original: iOS 6, Last: iOS 10.3.3 Jul. 19, 2017"
System on chip Apple A6
CPU 1.3 GHz dual core 32-bit ARMv7-A "Swift"
GPU PowerVR SGX543MP3
Memory 1 GB LPDDR2-1066 RAM
Storage 16, 32 or 64 GB
Battery 3.8 V, 5.45 Wh (1,440 mAh) Lithium-ion battery [8]
Data inputs "Multi-touch touchscreen display, 3-axis gyroscope, 3-axis accelerometer, Digital compass, Proximity sensor, Ambient light sensor"
Display "4 in (100 mm) diagonal (16:9 aspect ratio), multi-touch display, LED backlit IPS TFT LCD, 1,136×640 pixels at 326 ppi, 800:1 contrast ratio (typical), 500 cd/m2 max. brightness (typical), Fingerprint-resistant oleophobic coating on front"
Rear camera "Sony Exmor R IMX145[9][10], 8 MP iSight back-side illuminated sensor, HD video (1080p) at 30 frame/s, IR filter, Aperture f/2.4, 5 element lens, Facial recognition (stills only), Image stabilization"
Front camera 1.2 MP, HD video (720p)
Sound "Single loudspeaker, 3.5 mm TRRS, 20 Hz to 20 kHz frequency, response (internal, headset), 3.5 mm audio jack, Microphone"
Connectivity "All models: Wi-Fi (802.11 a/b/g/n) (802.11n: 2.4 and 5 GHz), Bluetooth 4.0, GPS & GLONASS, Quad-band GSM/GPRS/EDGE (850, 900, 1800, 1900 MHz), Quad-band UMTS/HSDPA+/DC-HSDPA (850, 900, 1900, 2100 MHz), 8-pin Lightning connector . . . Alternatives: GSM model (A1428): Dual-band LTE (Bands 4, 17: 1700 (AWS), 700b MHz); GSM model (A1429): Tri-band LTE (Bands 1, 3, 5: 2100, 1800, 850 MHz); —CDMA model (A1429): Tri-band 2G CDMA (800 (CDMA over ESMR), 850, 1900 MHz); Dual-band 3G CDMA/EV-DO Rev. A and Rev. B (850, 1900 MHz); Penta-band LTE (Bands 1, 3, 5, 13, 25: 2100, 1800, 850, 700c, 1900 MHz)."

The mobile application is a software program running in a consumer user's desktop computers and mobile computing device, allowing said consumer user to request assistance by voice and video call to said beauty consultant service provider, view the stores near said consumer user of the present invention and/or said consumer user's purchase history.

The content management system is a software tool that allows the creation, editing, and publishing content. The present invention's content management system element of the present invention is designed exclusively to manage content on the Web.

More particularly, said content management system allows an Internet interface for said beauty consultant service provider. It allows said beauty consultant service provider and said present invention's consumer user to communicate after said consumer user calls beauty consultant service provider, allows said beauty consultant service provider to view said consumer user's location on a map; both said consumer user and said beauty consultant service provider to research and select products based on said beauty market content residing in the which was stored in said content management system by beauty market content product sellers; allow both said consumer user and said beauty consultant service provider to search and select the stores which have desired beauty market content product and human staff to provide desired beauty market content product at said stores and send communications to both said consumer user and said beauty consultant service provider to encourage a visit to said store (such as a discount coupon).

The totem element of the present invention must have a dedicated application programming interface (API). An API is a set of subroutine definitions, communication protocols, and tools for building software. Said dedicated API is a set of clearly defined methods of communication among various components. Said totems are connected through AWS internet of things (iOT) to receive update or OTA. Thus, allowing aid totem to:
    receive calls from the end customer;
    show the advertising for brand; and
    connect consumer user by scanning a quick response code.

The consumer user of the present invention who happens to be a consumer can go to the store where said consumer user can find different types of totems and services including: 1) Multichoice, 2) "E-advisor"; 3) Multidevice, 4) Double and 5) Podium.

The Multichoice totem gives the consumer user the possibility to select different options and types of advice from a single totem. The Multichoice can therefore be: Multi-brand and/or—Multi consult.

With the Multi-brand option, the customer can choose between the different brands that are present on the totem to receive specific and detailed advice on the products of the selected brand.

After selecting a desired brand, it will be possible to select the type of consultancy desired between—makeup, fragrance, skin care,—hair and receive specific technical advice on the products of the selected axis based on the brand previously chosen.

In the same way the Multi-consult option works, through which the customer can select the type of advice he needs based on the desired axis. This type of advice will not be tied to any particular type of brand, but will then indicate to the customer which product to buy based on those present in the store.

The Multichoice option allows the customer to quickly and easily select the brand or the axis of products to which he is most interested or of which he is a regular customer, without the need to needlessly need to turn for the store in search of the shelf or counter of the brand and immediately receiving customized advice.

The E-advisor option includes a totem in store with a consultant available in streaming for 10 hours. With the E-advisor the customer can: 1) continue a consultancy previously initiated via APP on your device. In this case, as a totem, it will select an option such as a My Beauty Whisper option; and 2) start a new consultancy, directly through the totem in the store, selecting the Make a Call option With the Multidevice totem, the consumer after starting his advice on the main totem can easily continue the same on a tablet connected to the main totem. In this way the customer can go around the store freely but with a totally dedicated consultant, who will follow him in his purchases in the store and advising which products to try and then buy.

Another user of the present invention is an in-store consultant, also identified as a beauty consultant service provider. Said consultant will find in the store not only the totem to carry out his consultancy (starting a new one or continuing one started through the My Beauty Whisper or other app) but also a totem with product demonstration, to be able to try immediately and a physical consultant who can accompany it in the store or guide it to the use of the totem.

From the store owner's perspective, the present invention's totem This type of totem offers the store a double possibility: 1) Multi-brand and 2) Multi-consultant.

The Multi-brand allows the store to have on a single totem the possibility to choose different brands and therefore have a multiplicity of brands present simultaneously on a totem.

In this way the totem will be sponsored by the brands that want to be present within the totem selection.

Each brand will then have one or more consultants based on the axes and products that its brand proposes. For the store it will be like having a variety of possible consultants and as many consultants (related to the brand) within the same totem.

The Multi-consultant option has the same potential and functionality as the Multichoice, with the difference that the totem is single-brand or owned by the store itself with the possibility of having several consultants for different axes with a single totem (makeup, fragrance, skin care, hair) each available 10 hours each and specialized on its own axis.

Also, from the store owner's perspective said e-advisor option provides a beauty consultant service provider constantly available for 10 hours, who can provide advice to the client: —through a new call/advice via the Make a call option and—continue one that the customer has previously initiated through the app, via the present invention. In this way the store with a single totem will have a full coverage of 10 working hours, possibly 7 days a week, at no cost.

The multidevice is a totem that has the ability to provide tablet devices connected to it, so that the customer can continue his personal advice within the store without any problem.

In this way the store will make sure that it has never been occupied for too long, allowing other customers to use it but above all to be able to ensure multiple and contemporary consultancy throughout the store.

The multidevice option allows a large number of consultants present and operating all at the same time inside the store. Furthermore, the main video totem can be in the following mode:
  E-advisor (a consultant for 10 hours)
  Multi-choice (multi-brand or multi-consultant).
  The Double are two totems, present simultaneously in the store, of which one is in E-advisor mode, with a streaming consultant available on video, and another totem the Multi-choice or Multi-device mode.

This type of option exponentially expands the coverage of in-store consultants, allowing those unfamiliar with the service and approaching them for the first time to use the fixed totem with E-advisor service; while for the consumer users and/or regular customers it will be possible to use and buy in-store with the Multi-choice or Multi-device mode.

The Podium mode provides for the simultaneousness of multiple elements, online and offline, simultaneously.

Together with the totem, possible in Multi-choice and Multi-device mode, it will also be possible to provide a totem for product display and a physical consultant to support the use of the totem and to continue and conclude the sale of in-store products.

It should be noted that quick response code or QR code (abbreviated from Quick Response Code) is the trademark for a type of matrix barcode (or two-dimensional barcode). A barcode is a machine-readable optical label that contains information about the item to which it is attached.

The back-end element is suitable to provide the API for the actors defined above and for the query with an appropriate customer relationship management or CRM. The present invention requires a digital CMR system which automatically allows the present invention to manage and analyze customer interactions and data throughout the customer lifecycle, with the goal of improving customer service relationships and assisting in customer retention and driving sale.

The APIs element of the present invention is a service performed primarily by software. Said software for the present invention could be Software as a Service (SaaS) primarily exposed as an API (application programming interface). It allows consumer users to explore functionality of Web Services including Google Maps, and credit card processing. These APIs normally provide multiple entry points for API calls ranging from REST, WebSockets, XML web services or TCP/IP. The present invention requires an API element suitable to supply the API to collect information regarding the stores and the hours of availability of said beauty consultant service providers.

The payment system, such as PayPal APIs must be suitable to supply the API to make a payment with credit cards or other type of payment.

The global Data Stream Network (DSN) and real time infrastructure-as-a-service provider such as PubNub, must be suitable to supply the messaging service. It delivers messages to client platforms.

Please note that PubNub is a global Data Stream Network (DSN) and real time infrastructure-as-a-service (IaaS) company based in San Francisco, Calif. It produces products for software and hardware developers to build real time web, mobile, and Internet of Things (IoT) applications.

The Agora sub-system must be suitable to supply the WEB RTC service to make an audio/video call between consumer users and beauty consultant service provider.

Please note that Agora is a reflective, object-oriented programming language that is based exclusively on message passing and not delegation. An Agora sub-system may be incorporated into a totem and using for the analysis of communications including the identification of beauty products. Persons skill in the art understand that Agora may be substituted with another language which is reflective, object-oriented, and based exclusively on message passing and not delegation. For purposes of this disclosure, the Agora sub-system is merely a preferred language.

The preferred embodiment of the present invention uses the following components: first, a Route 53 resolver as DNS management to create individual zone. This allows a domain name associated with the present invention to resolve and integrate transmissions including: main domain, mail server TXT and DMARC, API for front end software, content management software (CMS) for beauty consultant service providers and static resources. Generally, the preferred embodiment of the current invention uses the inbound query capability is provided by Route 53 Resolver Endpoints, allowing DNS queries that originate on-premises to resolve AWS hosted domains.

Second, the preferred embodiment of the current invention uses cloud front as entry point for caching static resource or resource that do not change often over time. More specifically, the Amazon product CloudFront.net is used to redirect Internet transmissions.

Third, the preferred embodiment of the current invention uses API Gateway for mapping path to Elastic Beanstalk exposed services. Specifically, the present invention uses Elastic Beanstalk because it employs Auto Scaling and Elastic Load Balancing to scale and balance workloads. It provides tools in the form of Amazon CloudWatch to monitor the health of deployed applications as well.

Fourth, the preferred embodiment of the current invention uses Elastic Beanstalk as the core of the business logic. Beanstalk hosts the web APIs that delivery contents to the client applications, such as authentication, gives consultants and store list and much other.

Additionally, the preferred embodiment of the current invention uses S3 bucket for store files such as products images and consumer-user profile images. S3 is also used for store WEB CMS's source files; AWS Lambda to host microservices such as real time image resizes. RDS as the main ecosystem's database. For improve RDS performance we also use Elasticache to cache very common data queries such as retrieve consultants list and store list based on a consumer user's geolocation, and SES as the app's mail service for sending e-mails such as registration mail. SES gives high delivery rate and don't degrade web service app performance.

DETAILED DESCRIPTION OF THE INVENTION

Figure 1:
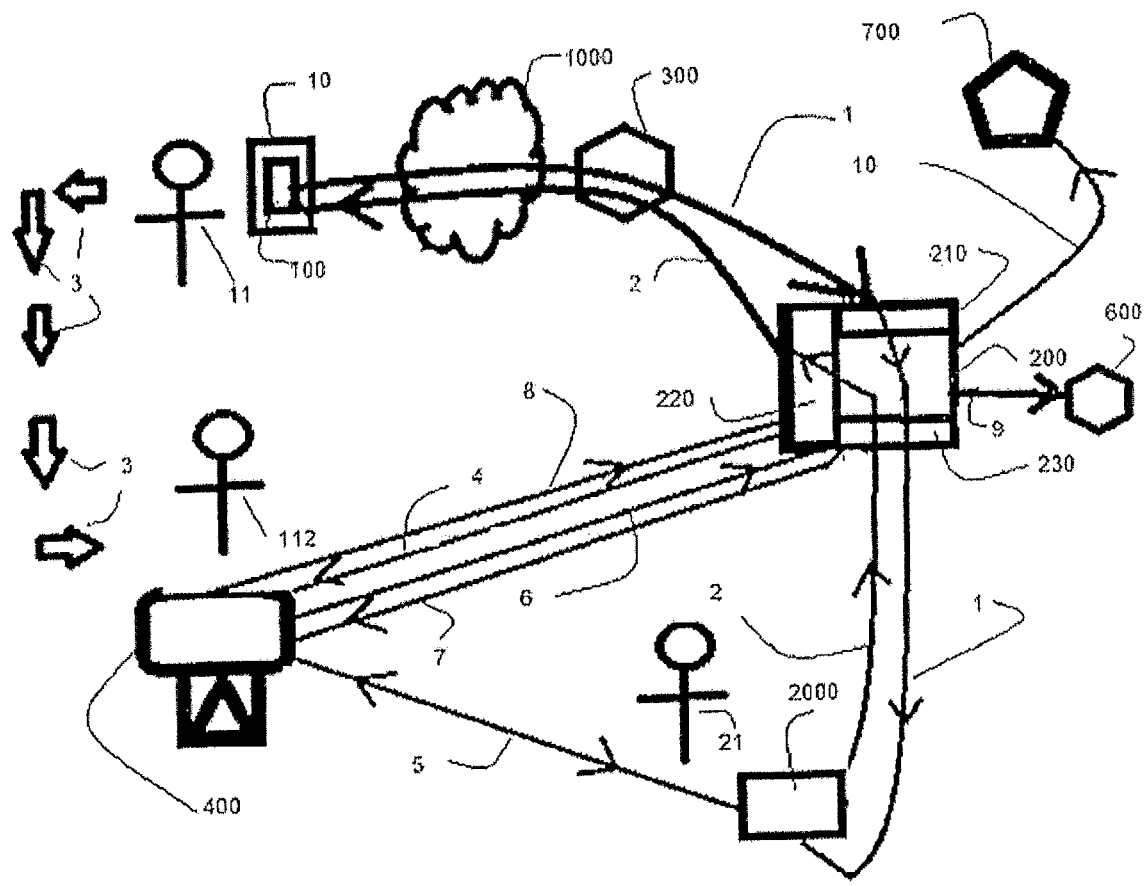
FIG. 1 is an overview of the preferred embodiment of the current invention.
Figure 2:
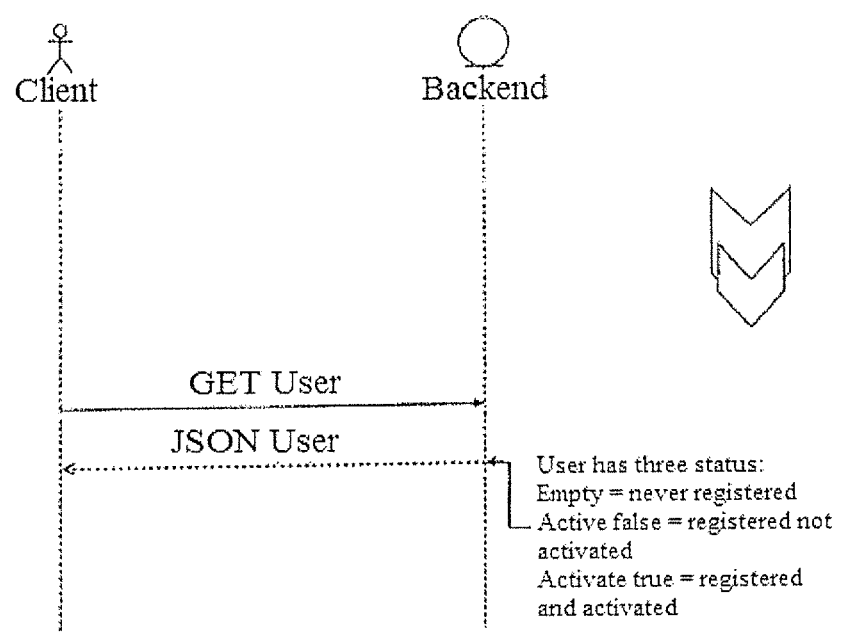
FIG. 2 through FIG. 10 are flowcharts of the front-end flow of the preferred embodiment of the current invention.
Figure 3:
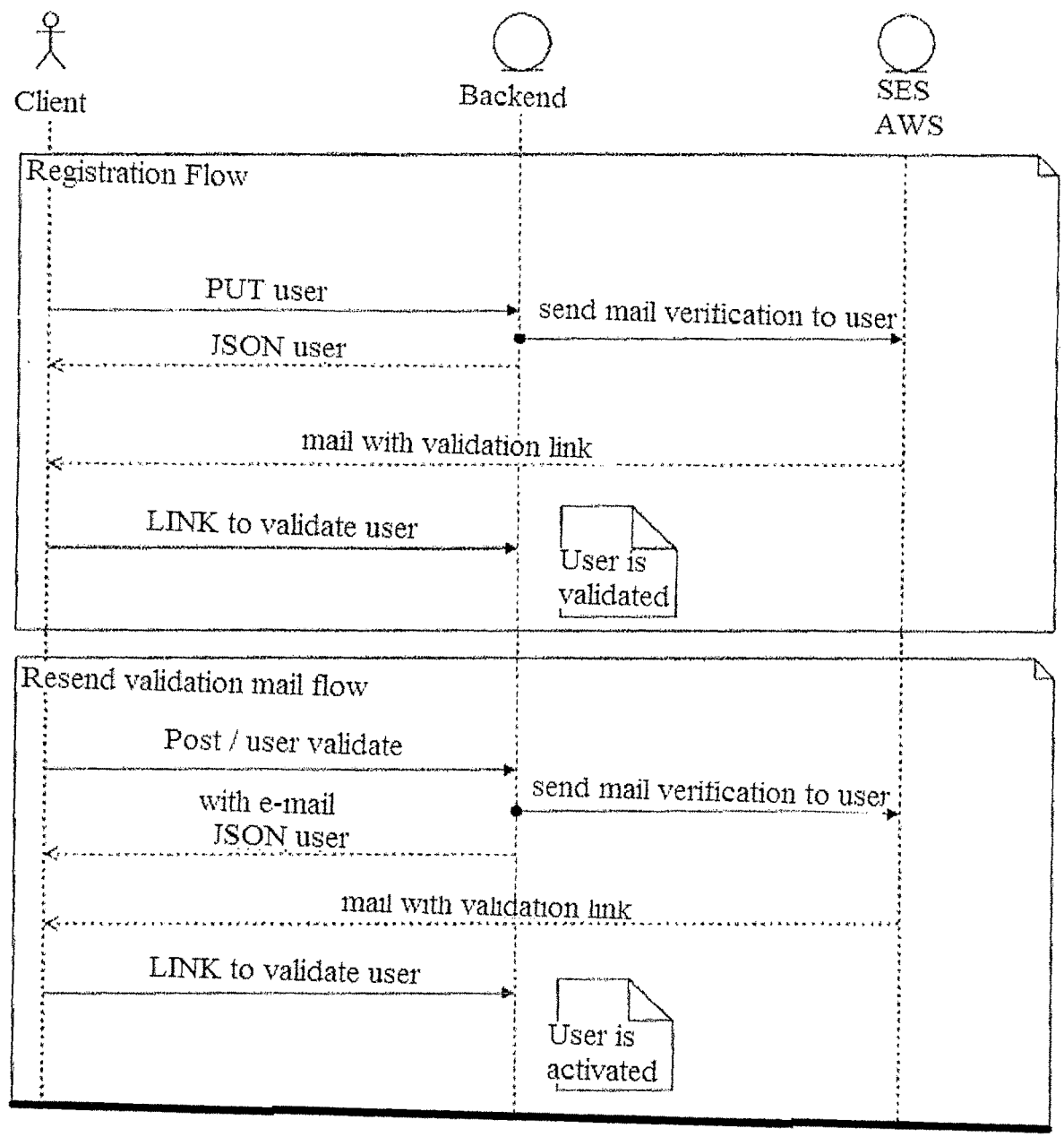
Figure 4:
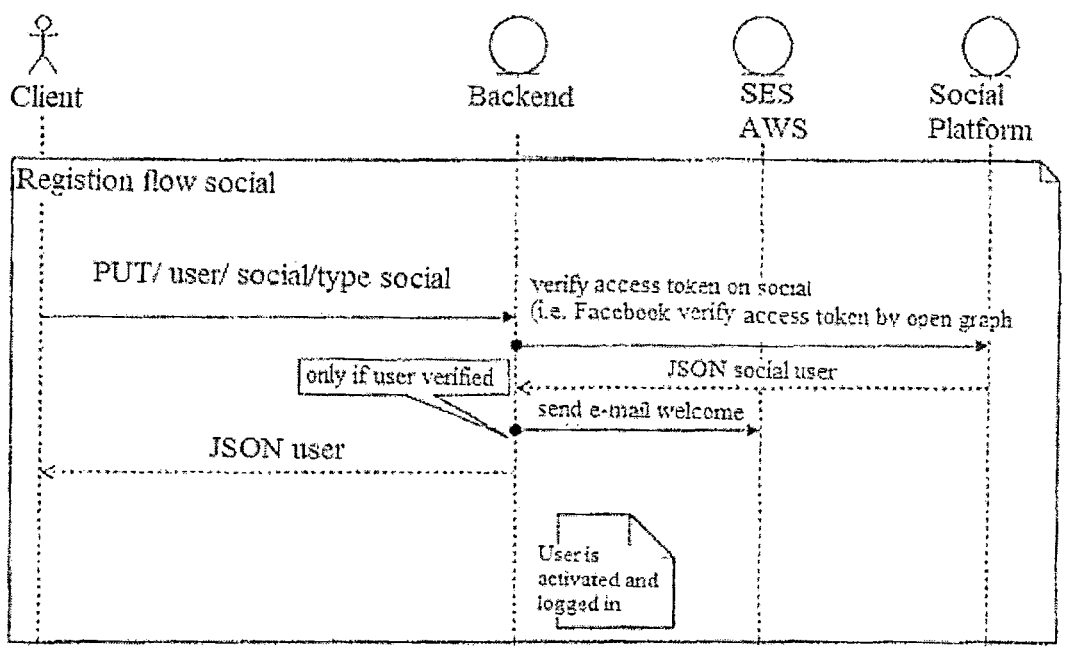
Figure 5:
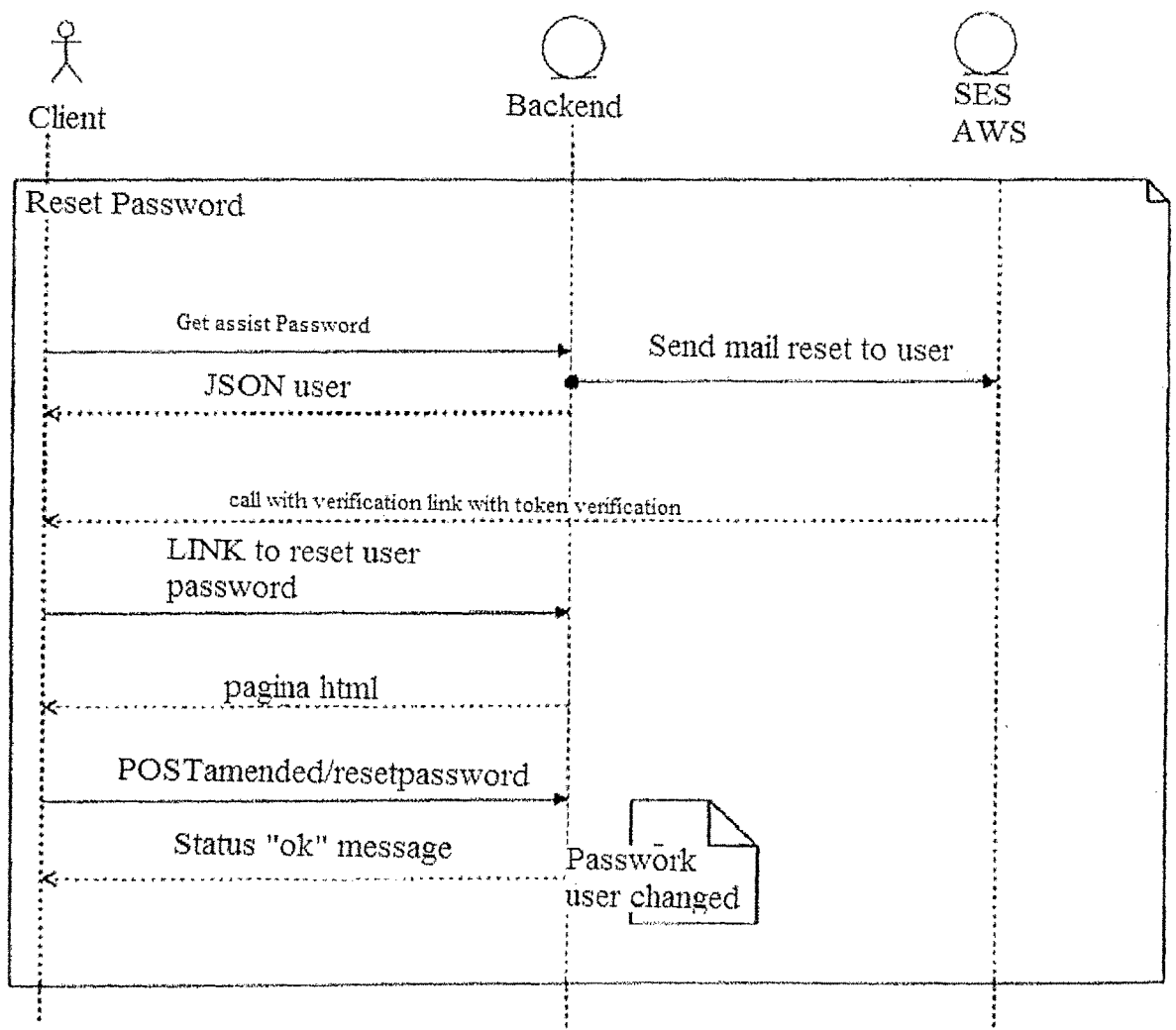
Figure 6:
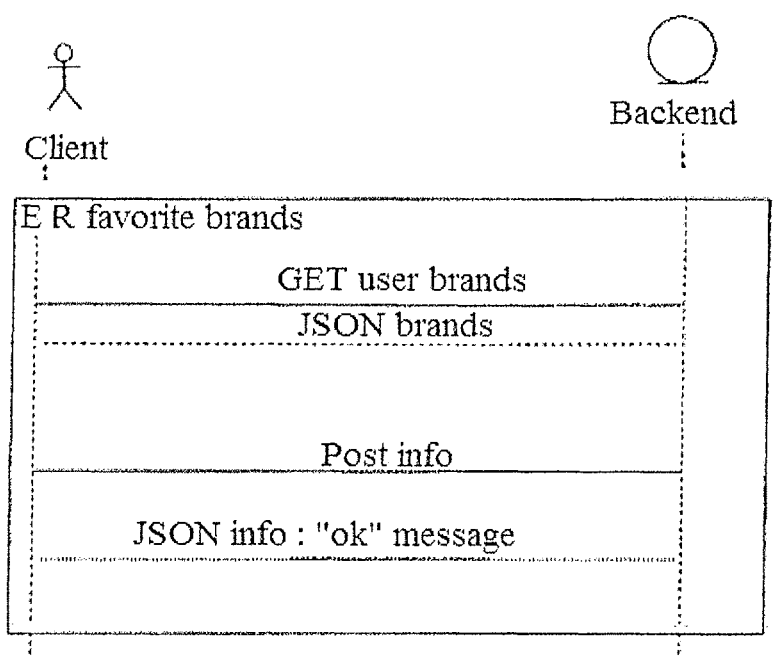
Figure 7:
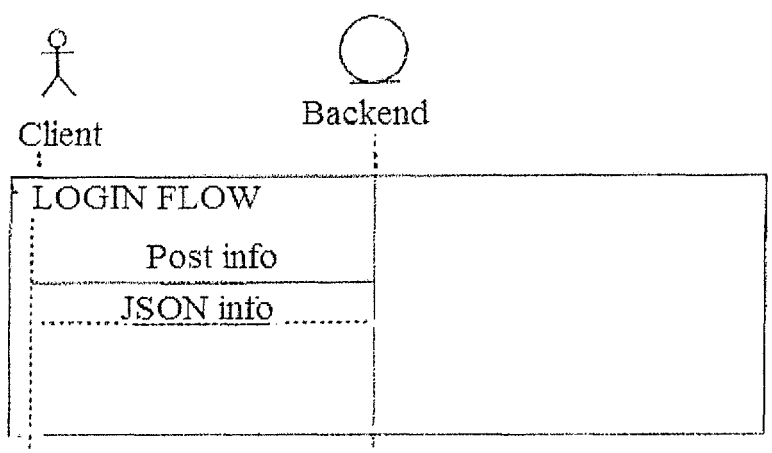
Figure 8:
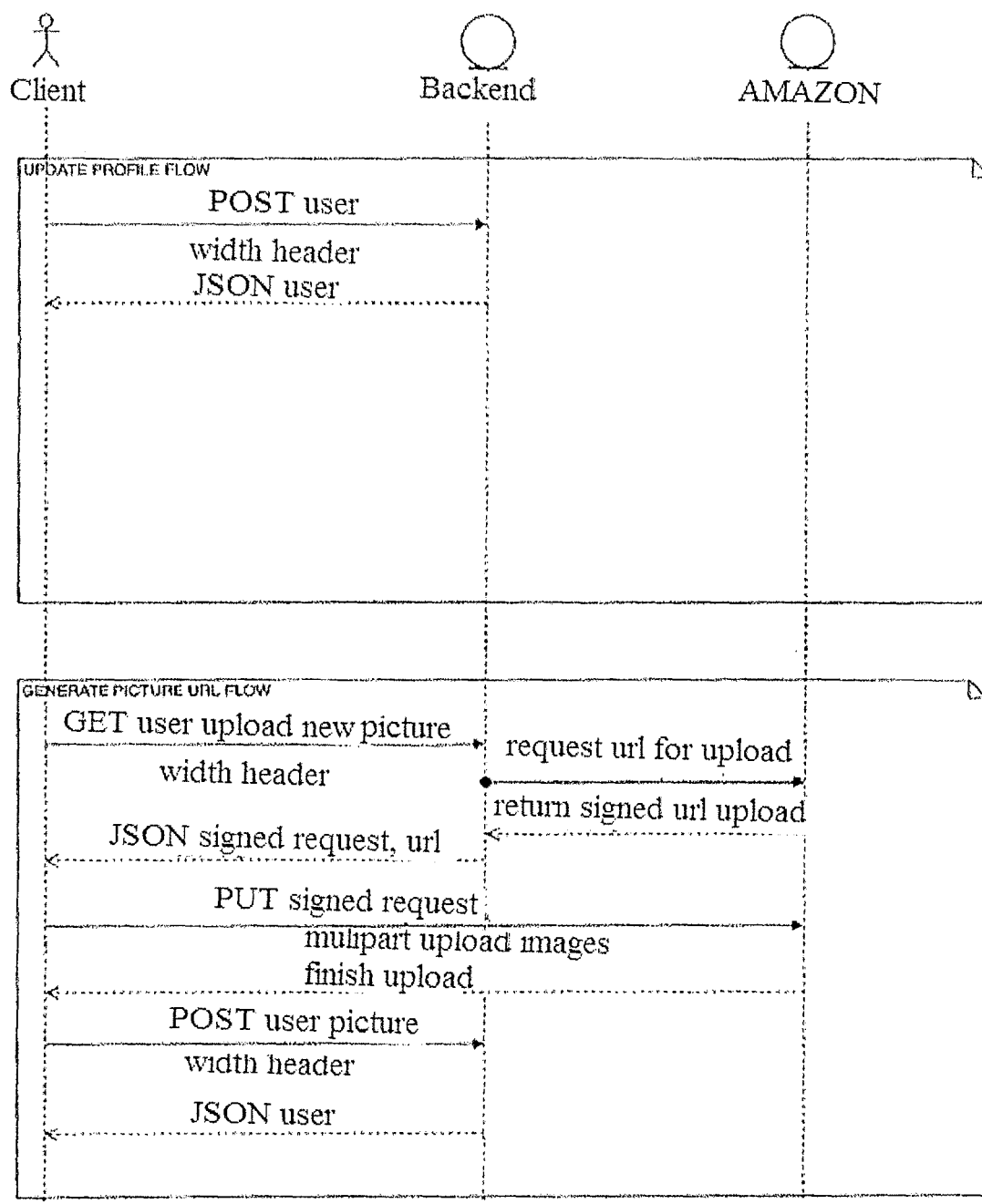
Figure 9:
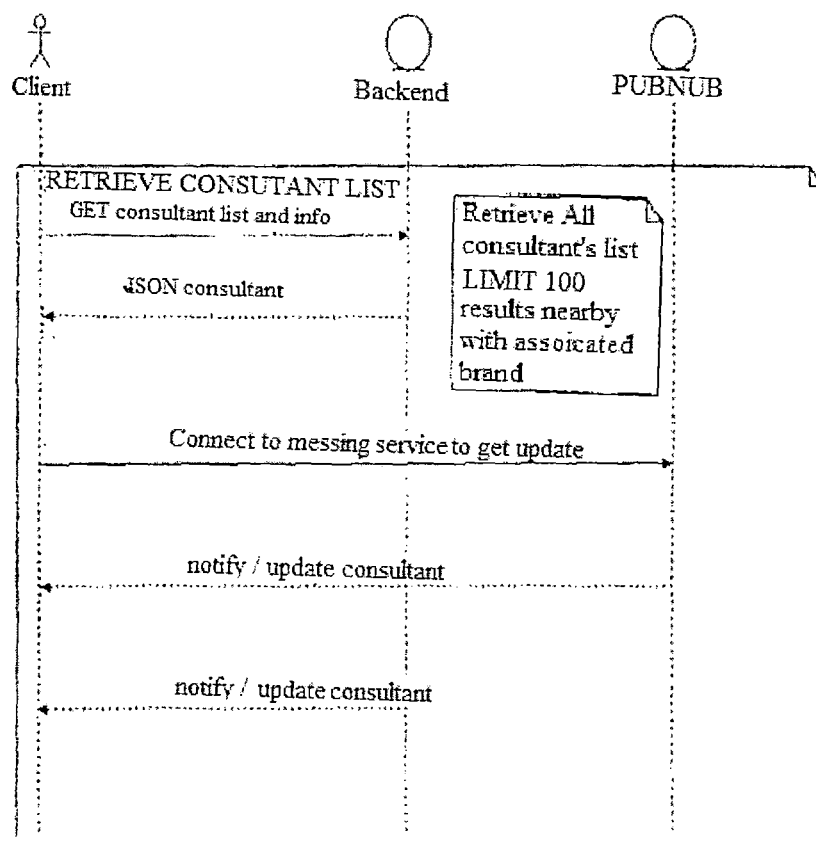
Figure 10:
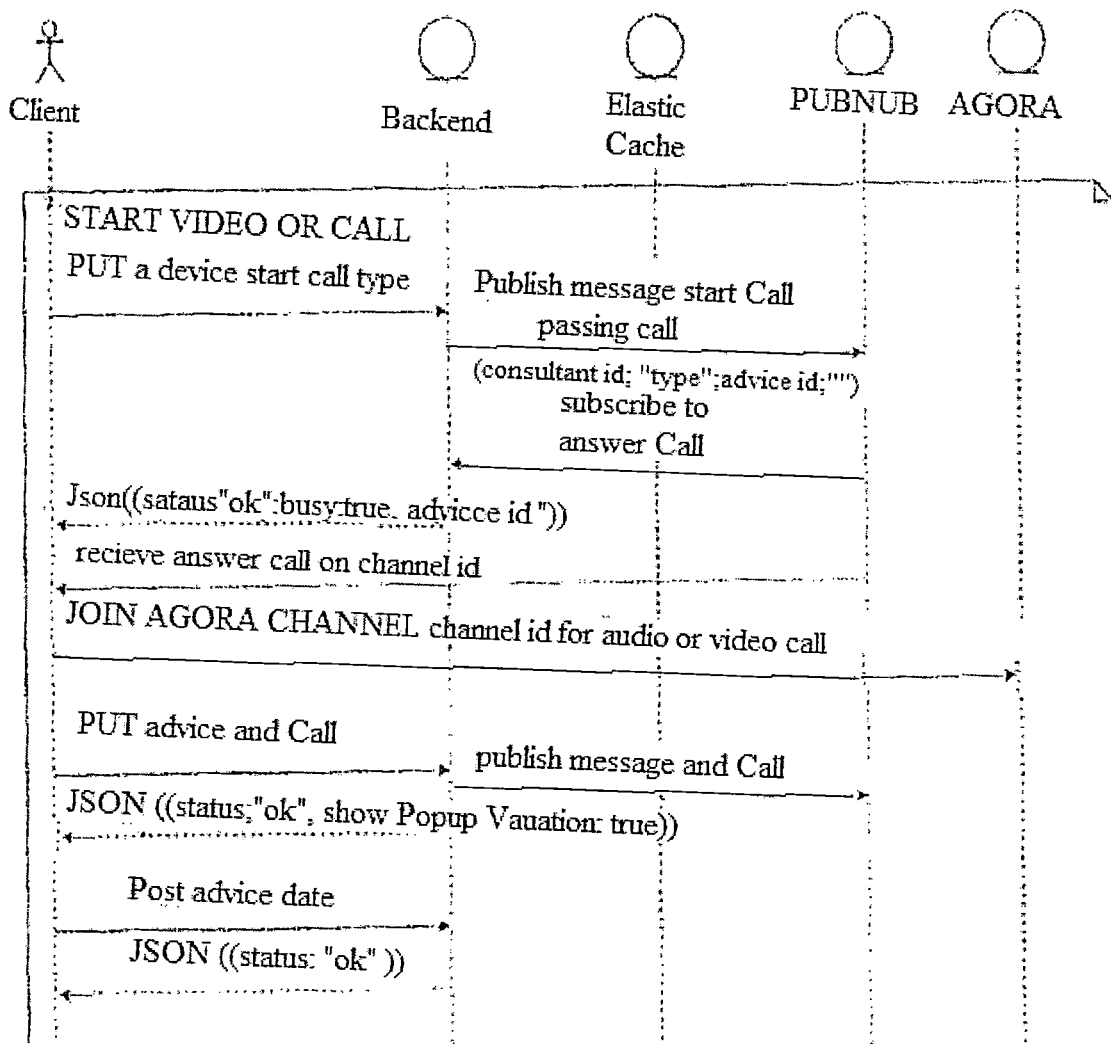
Figure 11:
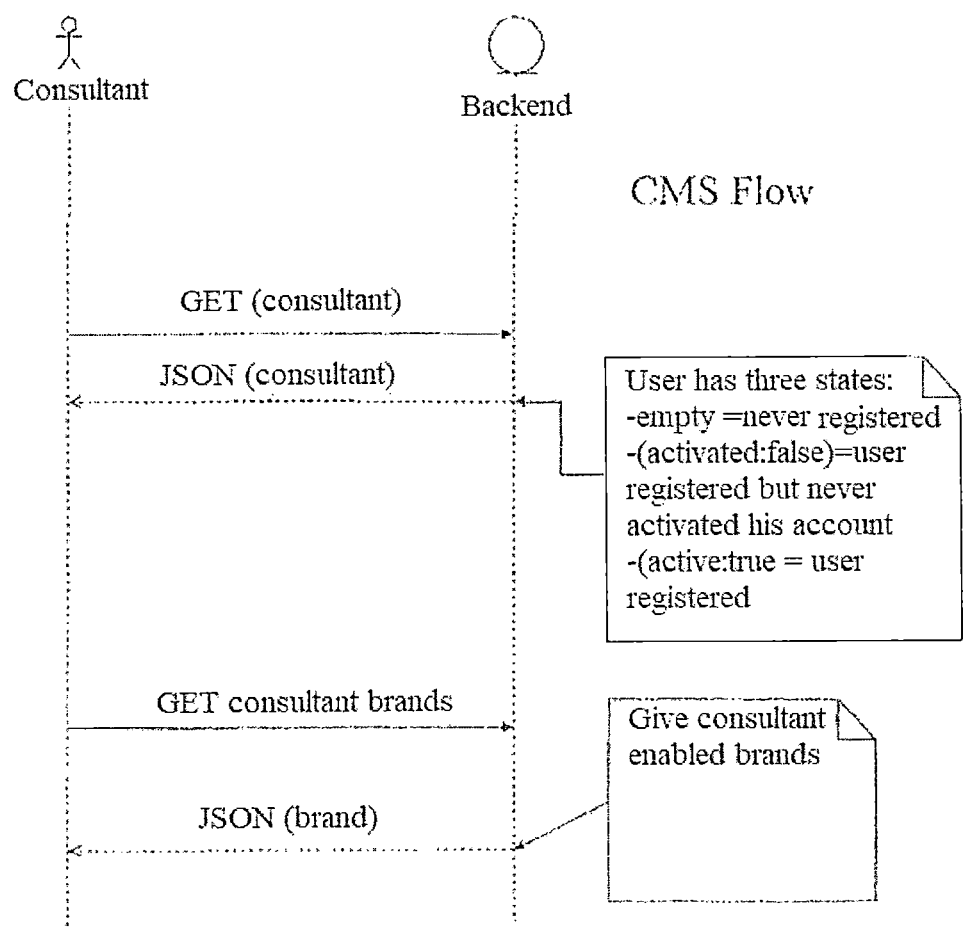
FIG. 11 through FIG. 16 are flowcharts of the CMS flow of the preferred embodiment of the current invention.
Figure 12:
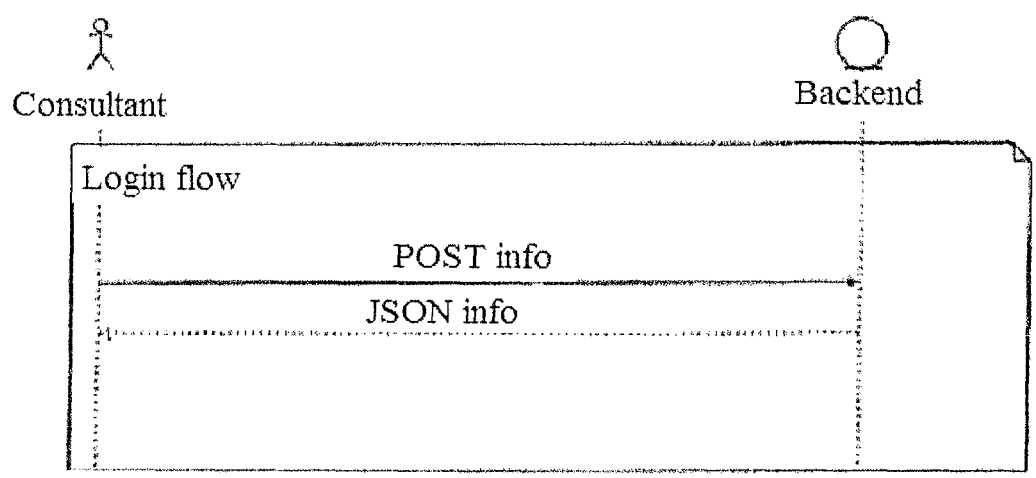
Figure 13:
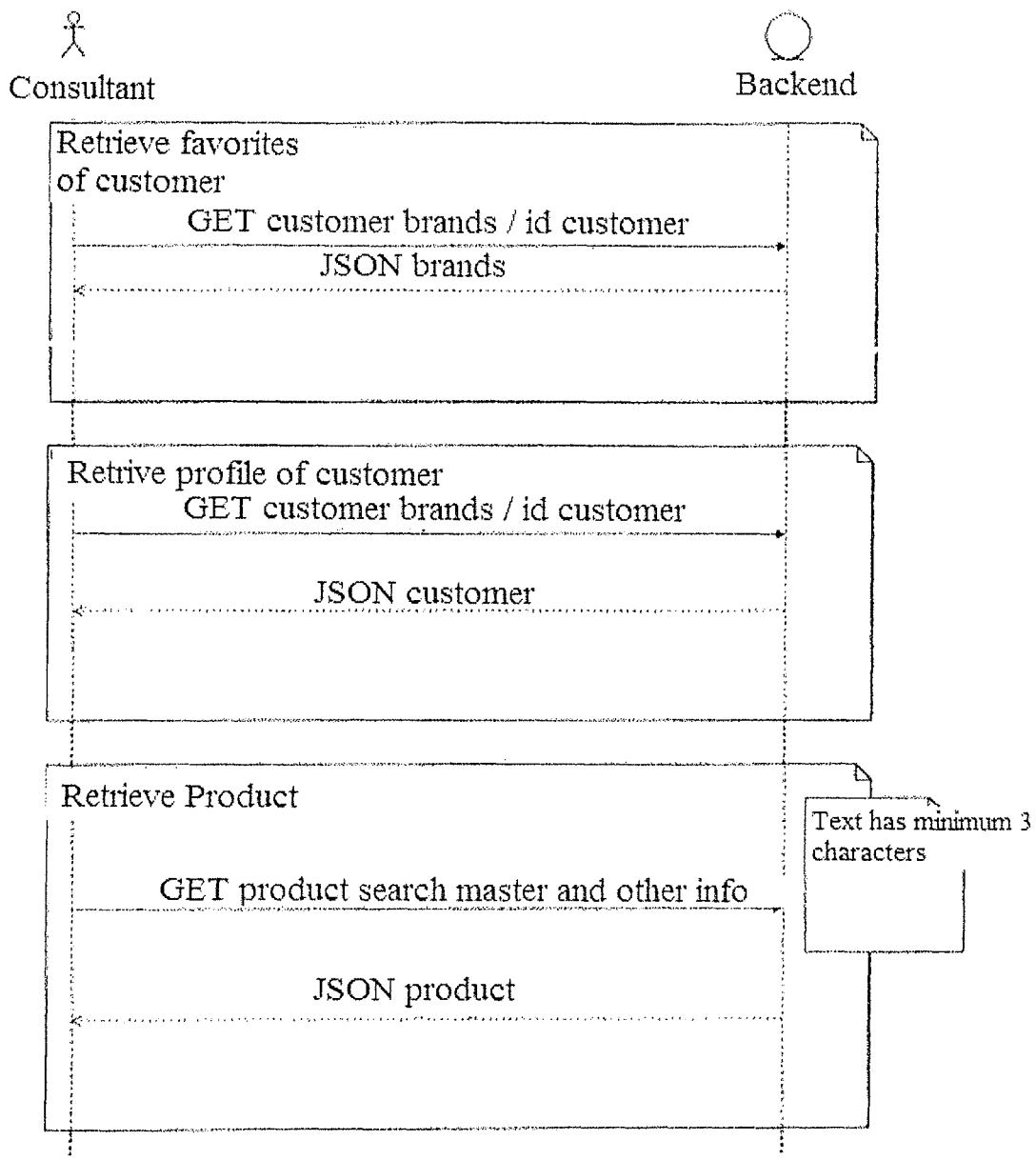
Figure 14:
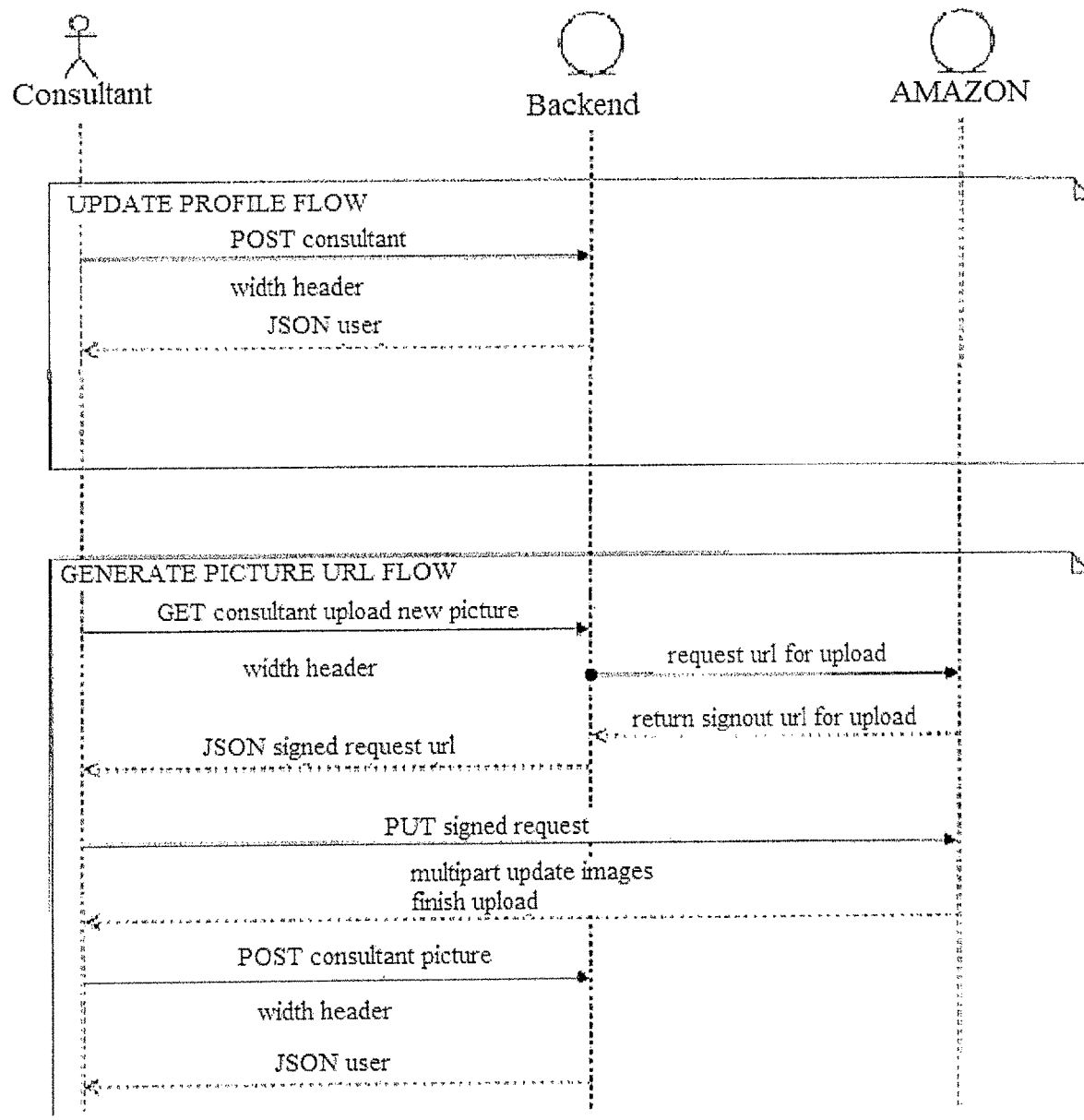
Figure 15:
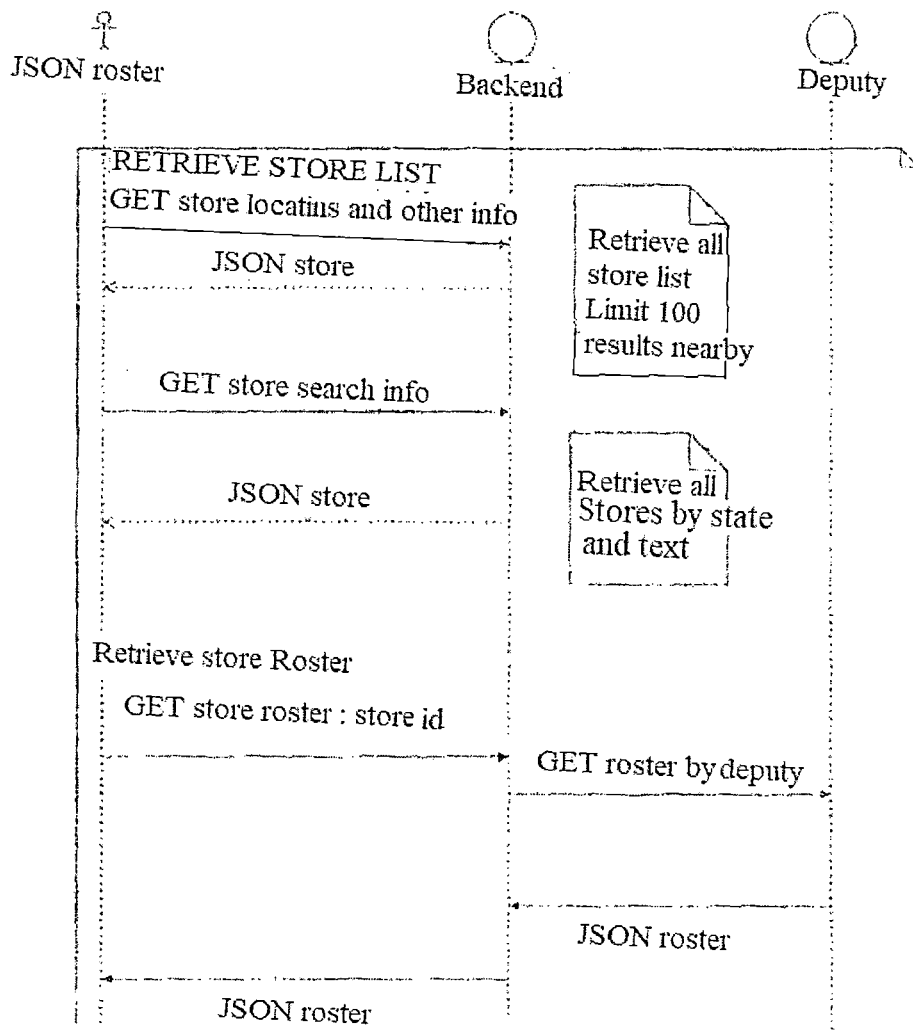
Figure 16:
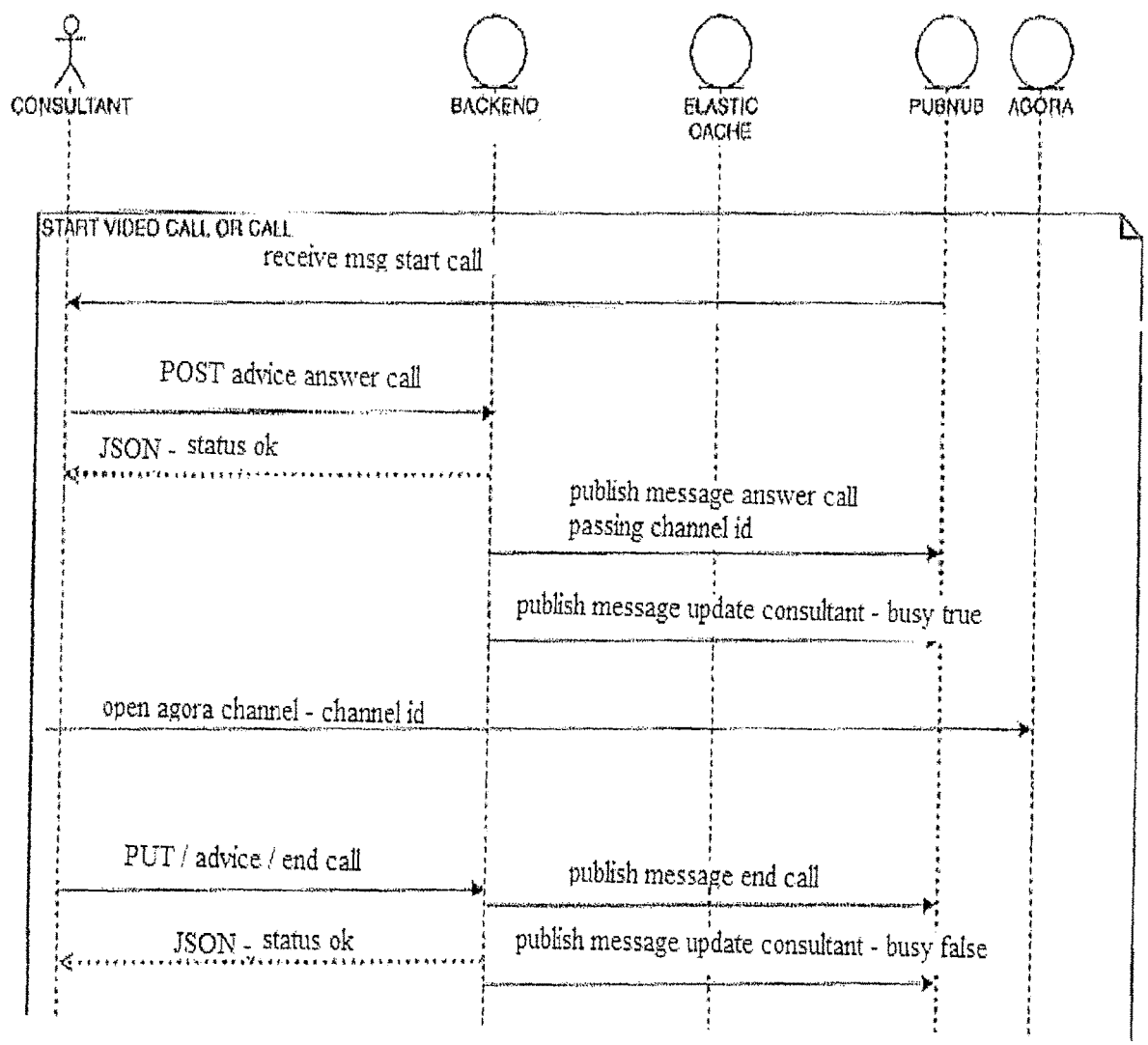
Figure 17:
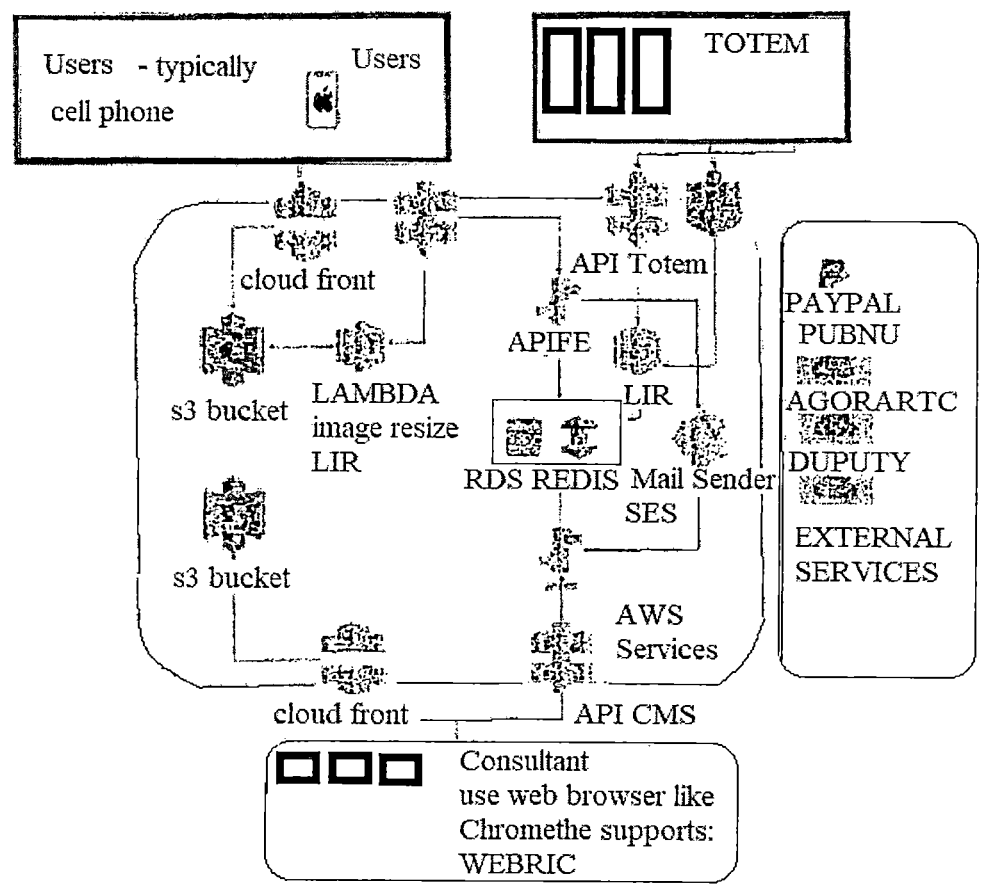
FIG. 17 is a diagram of the flow between the elements of the current invention.

Now referring FIG. 1, a method of operating a totem (400) for displaying transactional information and facilitating beauty market products where orders comprise at least one remote offer (1), at least one remote response c(2), the method requires establishing an electronic communication system among the following elements:
 a mobile application (100);
 a content management system (220);
 a totem (400);
 a back-end system (200);
 an application programming interface system (230);
 a global data stream network (DSN) (1000);
 a real time infrastructure-as-a-service provider (300); and
 an Agora sub-system which is a sub-system running in said back-end system (200).

The method is initiated by sending at least one remote offer (1) from a consumer user (11) who is using said mobile application (100) which is located on a mobile device (10) and is able to communicate using said global Data Stream Network (1000) to via said real time infrastructure (300)-as-a-service provider to said back-end system (200);

Upon the receipt of using said back-end system to confirm consumer-user (11) identity software (210);

authorizing consumer user (11) access content located in said content management system software (220);

establishing communication via sending at least one electronic inquiry (2) between said mobile application (100) and beauty consultant service provider (21) using computer device (2000);

sending at least one remote response (2) from said beauty consultant service provider (21) using said real time infrastructure-as-a-service provider (300) via said global Data Stream Network (DSN) (1000) to said mobile application (100) located in said mobile device (10) being used by consumer user (11);

analyzing at least one remote offer (1) from said consumer user (11) of said mobile application (100) and at least one remote response (2) from said beauty consultant service provider (21) using said content management system (220) to customize content and send said customized content said totem (400) via a first communication (4) said application programming interface system (230);

using at least one remote response (2) from said beauty consultant service provider (21) to stimulate said consumer user (11) to move (3) proximal to said totem (400) located remotely from said consumer user (11) wherein said consumer user (11) after said movement may be represented by (112); said stimulation may take the form of a customized coupon for a store in which totem (400) is located, thus giving said consumer user (11) an incentive to go to said store; alternatively, said stimulation may be in the form of an appointment for a meeting at a specific store wherein totem (400) is located, thus giving said consumer user (11) yet another incentive to move to said store, without limitation to other incentives known in the art such as product samples or gifts to be picked up at the target store by said consumer user (11);

displaying content from content management system (220) on said totem (400) when said moved consumer user (112) is proximal to said totem (400);

initiating real time communication (5) via said totem (400) between said moved consumer user (112) and said beauty consultant service provider (21) via said computer device (2000) when said moved consumer (112) user is proximal to said totem (400);

recording content of said real time communication via totem (400);

sending via a second communication (6) said recording to said Agora sub-system which is located in said back-end system (200). for analysis;

using Agora sub-system output said back-end system (200) communicates with content management system (220) selects beauty product content from content resident on said content management system (220) appropriate for said moved consumer user (112), wherein said beauty product content includes price and availability information for beauty products;

sending via a third communication (7) said price and availability information for said selected beauty products to said totem (400);

displaying a plurality of products with associated price and availability information for beauty products on said totem (400) based on said third communication (7);

receiving copies of real time communication (5) via a fourth communication (8) sound and video input from totem of both moved consumer user (112) of said beauty consultant service provider (121) indicating a quantity to be used to determine a quantity for each of a plurality of orders to be placed by said moved consumer user (112) at one or more price levels; alternatively, a proximal service provider may supplement said beauty consultant service provider (21) by further interaction with moved consumer user (112), said proximal service provider may bring and apply beauty products and otherwise promote a sale of said products;

charging said moved consumer user (112) credit card for said order or plurality of orders using a fifth communication (9) with payment management system (600).

sending via a sixth communication (10) the order for the default quantity at the desired price to a product distributor (700) which in turn ships said product to said consumer user (112).

Said product distributor (700) may include a product-distribution warehouse, a middleman distributor facility, shipment facility, vending machine, or employee entrusted with distributing or dispensing product.

Unless otherwise indicated, the functions described herein may be performed by software (e.g., including modules) including executable code and instructions running on one or more systems including one or more computers. Software may be stored in computer readable media (e.g., some or all of the following: optical media, CD-ROM, DVD, etc.), magnetic media (e.g., fixed or removable magnetic media), semiconductor memory (e.g., RAM, ROM, flash memory, EPROM, etc.), and/or other types of computer readable media.

The one or more computers can include one or more central processing units (CPUs) that execute program code and process data, non-transitory, tangible memory, including, for example, one or more of volatile memory, such as RAM for temporarily storing data and data structures during program execution, non-volatile memory, such as a hard disc drive, optical drive, or flash drive, for storing programs and data, including databases, a wired and/or wireless network interface for accessing an intranet and/or Internet, and/or other interfaces.

In addition, the computers can include a display for displaying user interfaces, data, and the like, and one or more user input devices, such as a keyboard, mouse, pointing device, touch screen, microphone and/or the like, used to navigate, provide commands, enter information, provide search queries, and/or the like. The systems described herein can also be implemented using general-purpose computers, special purpose computers, terminals, state machines, and/or hardwired electronic circuits.

Various embodiments provide for communications between one or more systems and one or more users. These user communications may be provided to a user terminal (e.g., an interactive television, a phone, a laptop/desktop computer, a device providing Internet access, or other networked device). For example, communications may be provided via Webpages, downloaded documents, email, SMS (short messaging service) message, MMS (multimedia messaging Service) message, terminal vibrations, other forms of electronic communication, text-to-speech message, or otherwise.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate embodiments also can be implemented in combination in a single embodiment. Conversely, various features that are described in the context of a single embodiment also can be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be described as occurring in a particular order, this should not be understood as requiring that Such operations be performed in the particular order described or in sequential order, or that all described operations be performed, to achieve desirable results. Further, other operations that are not disclosed can be incorporated in the processes that are described herein. For example, one or more additional operations can be performed before, after, simultaneously, or between any of the disclosed operations.

In certain circumstances, multitasking and parallel processing may be advantageous. Moreover, the separation of various system components in the embodiments described above should not be understood as requiring Such separation in all embodiments, and it should be understood that the described program components and systems can generally be integrated together in a single product or packaged into multiple products. Additionally, other embodiments are within the scope of the following claims. In some cases, the actions recited in the claims can be performed in a different order and still achieve desirable results.

I claim:

1. A system of hardware and software elements directed to the operation of a beauty consultant-consumer totem for selling goods which are proximal to said beauty consultant-consumer totem and simultaneously remote to a consumer user comprising the following elements:
   an App Mobile customer interface tool;
   a content-management system (CMS) web interface;
   said beauty consultant-consumer totem;
   wherein said beauty consultant-consumer totem comprises:
   a touch display;
     at least a 1.6 GHz totem L central processing unit (CPU),
       wherein said totem CPU has:
         at least 2 GB of random access memory (RAM); and
   a totem frame;
   at least one totem speaker; and
   at least one totem high resolution video camera
     wherein said resolution is at least 720 pixels running in a vertical line down a display area;

at least one Deputy application programming interface (API) information collector;
at least one PayPal API payment processor;
at least one PubNub API messaging service;
at least one Agora API WEB RTC (Web Real-Time Communication) service supplier;
a smart phone;
wherein said smart phone comprises:
a front phone camera;
a rear phone camera;
a phone 1.3 GHz CPU;
said phone CPU has:
   at least 1 GB RAM,
      wherein said RAM comprises timing parameter specification LPDDR2-1066; and
   at least 16 GB of storage
   a phone display;
      at one least one phone having a Wi-Fi support system
         wherein said Wi-Fi support system comprises wireless router specifications 802.11 b/g/n;
a phone G-sensor support system;
a phone 3G enabled support system;
a phone Bluetooth 4.0 support system; and
at least one phone loud speaker;
a pad-tablet computer;
wherein said pad-tablet computer comprises:
   a high resolution pad-tablet computer front camera,
      wherein said resolution is at least 720 pixels running in a vertical line down a display area;
   a high resolution pad-tablet computer rear camera
      wherein said resolution is at least 720 pixels running in a vertical line down a display area;
   a 1.3 GHz pad-tablet computer CPU;
   a pad-tablet computer touch screen data display;
   a pad-tablet computer loud speaker;
   a high resolution pad-tablet computer front camera
      wherein said resolution at least 720 pixels running in a vertical line down a display area; and
      a pad-tablet computer connectivity support system;
a Route 53 domain-name system (DNS) manager;
a Cloudfront static resources cache;
an API Gateway path mapper;
an Elastic Beanstalk business logic software;
a Bucket S3;
an Amazon Web Services (AWS) Lambda microservices host;
an; RDS a Relational Database Service (RDS) database;
an SES a simple e-mail service (SES) mail servicer;
an AWS Internet-of-Things (IoT) totem contactor; and
a back-end;
a subset of said system of hardware and software elements comprising:
   said smart phone;
   said content-management system (CMS) web interface;
   said beauty consultant-consumer totem;
   said back-end;
      wherein said back-end is configured to execute said at least one Deputy application programming interface (API) information collector;
   said at least one PayPal API payment processor;
      wherein said at least one PayPal API payment processor communicates with said at least one PubNub API messaging service;
a global data stream network (DSN);
   said at least one Agora API WEB RTC (Web Real-Time Communication) service;
   said at least one Agora API WEB RTC (Web Real-Time Communication) service supplier; and
said pad-tablet computer;
said subset of said system of hardware and software elements is configured to
a. sending said at least one remote offer from said consumer user of said mobile application in said mobile device in using said global DSN through said real time infrastructure-as-a-service provider to said back-end system;
b. using said back-end to confirm said consumer user's identity;
c. authorizing said consumer user access to content located in said content management system;
d. establishing communication between said mobile application and a beauty consultant service provider via a computer device;
e. sending said at least one remote response from said beauty consultant service provider via said back-end via said real time infrastructure-as-a-service provider via said DSN to said mobile device for display by said mobile application;
f. stimulating said consumer user to move proximal to said beauty consultant-consumer totem located remotely from said consumer user, wherein said consumer user hereafter is converted to a moved consumer user;
g. displaying content from said content management system on said totem when said moved consumer user is proximal to said beauty consultant-consumer totem;
h. initiating a real time communication via said beauty consultant-consumer totem between said moved consumer user and said beauty consultant service provider via said computer device when said moved consumer user is proximal to said beauty consultant-consumer totem;
i. recording content of said real time communication via beauty consultant-consumer totem;
j. sending via a second communication said recording to said Agora sub-system which is located in said back-end for analysis;
k. using Agora sub-system output, said back-end communicates with said content management system and selects beauty product information from said content management system appropriate for said moved consumer user, wherein said beauty product information includes price-and-availability data for said selected beauty product information;
l. sending via a third communication said price-and-availability data for said selected beauty product information to said beauty consultant-consumer totem;
displaying a plurality of products with said price-and-availability data for said selected beauty products on said beauty consultant-consumer totem based on said third communication;
m. receiving copies of real time communications via a fourth communication, a sound-and-video input from said beauty consultant-consumer totem from both moved consumer user and said beauty consultant service provider, indicating a quantity to determine a quantity for each of a plurality of orders to be placed by said moved consumer user at one or more price levels;

n. charging a credit card of said moved consumer user for said order or plurality of orders via a fifth communication using a payment management system;

o. sending via a sixth communication said order for a default quantity at a desired price to a product distributor for shipment.

2. The system according to claim 1, wherein if said consumer user's identity is not confirmed, the further step of invoking a registration element.

3. The system according to claim 1, wherein access to said beauty consultant service provider is governed by a token payment system.

4. The system according to claim 1, wherein said mobile device running a mobile application capable of display is a mobile computer.

5. The system according to claim 1, wherein said mobile device running a mobile application capable of display is a smartphone.

6. The system according to claim 1, wherein said mobile device running a mobile application capable of display is a computer tablet.

\* \* \* \* \*